(12) United States Patent
Kreis et al.

(10) Patent No.: US 11,676,101 B2
(45) Date of Patent: Jun. 13, 2023

(54) SYSTEMS AND METHODS FOR USING KITS AS A SOURCE OF INVENTORY IN A FULFILLMENT CENTER

(71) Applicant: 6 River Systems, LLC, Waltham, MA (US)

(72) Inventors: Jeff Kreis, Wolfeboro, NH (US); Alexa Mellon, Cambridge, MA (US)

(73) Assignee: 6 RIVER SYSTEMS, LLC, Waltham, MA (US)

(*) Notice: Subject to any disclaimer, the term of this patent is extended or adjusted under 35 U.S.C. 154(b) by 0 days.

(21) Appl. No.: 17/378,460

(22) Filed: Jul. 16, 2021

(65) Prior Publication Data
US 2022/0405705 A1 Dec. 22, 2022

Related U.S. Application Data

(60) Provisional application No. 63/211,489, filed on Jun. 16, 2021.

(51) Int. Cl.
*G06Q 10/08* (2012.01)
*G06Q 50/28* (2012.01)
(Continued)

(52) U.S. Cl.
CPC ..... *G06Q 10/0875* (2013.01); *G06Q 10/0835* (2013.01); *G06Q 10/0838* (2013.01); *G06Q 50/28* (2013.01)

(58) Field of Classification Search
CPC .......... G06Q 10/0875; G06Q 10/0835; G06Q 10/0838; G06Q 50/28
See application file for complete search history.

(56) References Cited

U.S. PATENT DOCUMENTS

| 4,894,908 A | 1/1990 | Haba, Jr. et al. |
| 5,412,576 A | 5/1995 | Hansen |

(Continued)

FOREIGN PATENT DOCUMENTS

| WO | 2019217420 | 11/2019 |
| WO | 2020257389 | 12/2020 |

OTHER PUBLICATIONS

Rheude, Jake. "Kitting Process Flow in Fulfillment". Retrieved from <https://redstagfulfillment.com/kitting-process-flow-in-fulfillment/>. Originally published Aug. 31, 2021. (Year: 2021).*

(Continued)

*Primary Examiner* — Nathan A Mitchell
(74) *Attorney, Agent, or Firm* — Hanley, Flight & Zimmerman, LLC

(57) ABSTRACT

Systems and methods for using kits as a source of inventory in a fulfillment center are described herein. The example systems can be configured to receive a determination to use a kit as a source of a first item, where the kit comprises the first item and a second item. The determination can be based on a low inventory threshold for the first item as well as order data for the first item and the kit. The systems can identify the kit location and create a kit disassembly pick job. The kit disassembly pick job can identify the kit location and provide instructions for disassembling the kit. The systems can transmit the kit disassembly pick job to an autonomous vehicle for completion.

20 Claims, 6 Drawing Sheets

(51) Int. Cl.
  *G06Q 10/0875* (2023.01)
  *G06Q 10/0835* (2023.01)
  *G06Q 10/083* (2023.01)

(56) References Cited

U.S. PATENT DOCUMENTS

| | | | |
|---|---|---|---|
| 5,953,707 | A | 9/1999 | Huang et al. |
| 6,119,102 | A | 9/2000 | Rush et al. |
| 6,151,582 | A | 11/2000 | Huang et al. |
| 6,847,858 | B2 | 1/2005 | Arnold et al. |
| 7,532,947 | B2 | 5/2009 | Waddington et al. |
| 7,747,340 | B2 | 6/2010 | Jones |
| 8,024,237 | B1 | 9/2011 | Davidson et al. |
| 8,229,791 | B2 | 7/2012 | Bradley et al. |
| 8,402,426 | B2 | 3/2013 | Alfandary et al. |
| 8,600,841 | B2 | 12/2013 | Cheng et al. |
| 8,892,241 | B2 | 11/2014 | Weiss |
| 9,834,380 | B2 | 12/2017 | Hamilton et al. |
| 10,053,289 | B2 | 8/2018 | Hamilton et al. |
| 10,294,028 | B2 | 5/2019 | Hamilton et al. |
| 10,618,735 | B1 | 4/2020 | Oh et al. |
| 10,657,492 | B1 | 5/2020 | Wei et al. |
| 10,706,387 | B1 | 7/2020 | Cui et al. |
| 10,807,800 | B2 | 10/2020 | Hamilton et al. |
| 10,997,554 | B1* | 5/2021 | McMaster ........... G06F 16/2379 |
| 11,137,742 | B2 | 10/2021 | Wise et al. |
| 11,345,546 | B2 | 5/2022 | Cacioppo et al. |
| 2002/0069134 | A1* | 6/2002 | Solomon .............. G06Q 50/188 |
| | | | 705/26.4 |
| 2004/0044557 | A1 | 3/2004 | Frech et al. |
| 2005/0060243 | A1* | 3/2005 | Whetman ............ G06Q 10/087 |
| | | | 705/28 |
| 2005/0075949 | A1 | 4/2005 | Uhrig et al. |
| 2008/0162298 | A1* | 7/2008 | Aliabadi .............. G06Q 10/087 |
| | | | 705/26.5 |
| 2009/0082902 | A1 | 3/2009 | Foltz et al. |
| 2009/0164343 | A1 | 6/2009 | Hurtis et al. |
| 2009/0319401 | A1* | 12/2009 | Rao ....................... G06Q 10/087 |
| | | | 705/29 |
| 2013/0173049 | A1 | 7/2013 | Brunner et al. |
| 2014/0100715 | A1 | 4/2014 | Mountz et al. |
| 2014/0365258 | A1* | 12/2014 | Vestal ................... G05D 1/0297 |
| | | | 901/1 |
| 2015/0368044 | A1* | 12/2015 | Olson .................. B65G 1/1373 |
| | | | 700/216 |
| 2016/0275428 | A1 | 9/2016 | Halbrook et al. |
| 2017/0158431 | A1 | 6/2017 | Hamilton et al. |
| 2017/0348857 | A1 | 12/2017 | Vasquez et al. |
| 2018/0084242 | A1* | 3/2018 | Rublee .................... G06T 17/00 |
| 2018/0218320 | A1* | 8/2018 | Lee ....................... G06K 17/0022 |
| 2019/0283252 | A1 | 9/2019 | Skaaksrud et al. |
| 2020/0030967 | A1 | 1/2020 | Goodwin, III |
| 2020/0094997 | A1 | 3/2020 | Menon et al. |
| 2020/0095001 | A1 | 3/2020 | Menon et al. |
| 2020/0279217 | A1 | 9/2020 | Gravelle et al. |
| 2020/0302391 | A1 | 9/2020 | Li et al. |
| 2020/0310391 | A1 | 10/2020 | Cole et al. |
| 2020/0311644 | A1 | 10/2020 | Willard, III et al. |
| 2020/0357040 | A1 | 11/2020 | Patel et al. |
| 2021/0019037 | A1 | 1/2021 | Treadway et al. |
| 2021/0049037 | A1* | 2/2021 | Kattepur ................ B25J 9/1661 |
| 2021/0090106 | A1 | 3/2021 | Gu et al. |
| 2021/0110461 | A1 | 4/2021 | Wang et al. |
| 2021/0192660 | A1 | 6/2021 | Delgado et al. |
| 2021/0248548 | A1 | 8/2021 | Guhya |
| 2022/0048707 | A1 | 2/2022 | Matl et al. |
| 2022/0088778 | A1 | 3/2022 | Sun et al. |
| 2022/0092541 | A1 | 3/2022 | Cacioppo et al. |
| 2022/0179416 | A1 | 6/2022 | Cacioppo |
| 2022/0230125 | A1 | 7/2022 | Vedantam et al. |
| 2022/0315353 | A1 | 10/2022 | Sun et al. |
| 2022/0405669 | A1 | 12/2022 | Kreis et al. |
| 2022/0405697 | A1 | 12/2022 | Kreis et al. |
| 2023/0004156 | A2 | 1/2023 | Cacioppo et al. |

OTHER PUBLICATIONS

"What is Kitting? A Look at the Order Fulfillment Strategy". Retrieved from <https://www.electronicfasteners.com/what-is-kitting-a-look-at-the-order-fulfillment-strategy/>. Origianlly published Nov. 2020. (Year: 2020).*

United States Patent and Trademark Office, "Non-Final Office Action," issued in connection with U.S. Appl. No. 17/378,406, dated Sep. 20, 2022, 19 pages.

United States Patent and Trademark Office, "Non-Final Office Action," issued in connection with U.S. Appl. No. 17/378,439, dated Dec. 14, 2022, 29 pages.

Comand et al., "Optimization of a Kitting Line: A Case Study," MDPI, Robotics, published Aug. 7, 2019, 19 pages.

Pavlichenko et al., "KittingBot: A Mobile Manipulation Robot for Collaborative Kitting in Automotive Logistics," 15th International Conference on Intelligent Autonomous Systems (IAS-15), Jun. 2018, 15 pages.

Boudella et al., "Modeling kitting operations in a semi-robotic environment," 7th IESM Conference, Oct. 2017, 7 pages.

Bottin et al., "Sales Kit Automated Production: An Integrated Procedure for Setup Reduction in Case of High Products Variety," Applied Sciences, vol. 11, published Oct. 28, 2021, 15 pages.

Crosby et al., "Integrating Missing, Logistics, and Task Planning for Skills-Based Robot Control in Industrial Kitting Applications," Proceedings of the 34th Workshop of UK Planning and Scheduling Special Interest Group, 2017, 7 pages.

Oracle Warehouse Management Cloud—User Guide—Release 20C, Oracle, 2020, 290 pages.

Quante, Rainer, "Management of Stochastic Demand in Make-to-Stock Manufacturing," Peter Lang Publishing, 2018, 134 pages.

Caputo et al., "A model for kitting operations planning," Assembly Automation, vol. 35, No. 1, 2015, 13 pages.

Interlake Mecalux, "Kitting: optimizing assembly in the warehouse," InterlakeMecalux.com, Dec. 22, 2020, 10 pages.

Ramaraj et al., "A Two-Stage Stochastic Programming Model for Production Planning in a Kitting Facility Under Demand and Yield Uncertainties," Proceedings of the 2017 Industrial Systems Engineering Conference, 2017, 7 pages.

United States Patent and Trademark Office, "Final Office Action," issued in connection with U.S. Appl. No. 17/378,406, dated Mar. 9, 2023, 24 pages.

United States Patent and Trademark Office, "Final Ofice Action," issued in connection with U.S. Appl. No. 17/378,439, dated Mar. 24, 2023, 29 pages.

Zhang et al., "Dynamic pooling of make-to-stock and make-to-order operations," Int. J. Production Economics 144 (2013), pp. 44-56, available online Jan. 23, 2013, 13 pages.

Murby, "Inventory Control in a Hybrid Make-to-order-Make-to-stock Multiproduct Manufacturing System," Lund University LTH Faculty of Engineering, 2019, 131 pages.

Kaminsky el al., "Combined make-to-order/make-to-stock supply chains," IIE Transactions 41 (2009), pp. 103-119, 8 pages.

Simren, "Assemble to Order with Inventory Picks and Movements," Microsoft Dynamics NAV & 365 Business Central Blog, May 20, 2015, 12 pages.

Beemsterboer et al., "Hybrid MTO-MTS production planning: An explorative study," Elsevier, European Journal of Operational Research 248 (2016), pp. 453-461, available online Jul. 21, 2015, 9 pages.

Atan, et al., "Assemble-to-order systems: A review," European Journal of Operational Research 261 (2017), pp. 866-879, available online Feb. 24, 2017, 14 pages.

Microsoft Dynamics 365 Business Central: Assembly Management (Kitting) without the need of manufacturing functionality, Oct. 30, 2020, retrieved from The Wayback Machine at https://zyhums.com/4491/, 28 pages.

Soman, et al., "Comparison of dynamic scheduling policies for hybrid make-to-order and make-to-stock production systems with stochastic demand," Int. J. Production Economics 104 (2006), pp. 441-453, available online Oct. 12, 2004, 13 pages.

(56) References Cited

OTHER PUBLICATIONS

Microsoft Dynamics 365 Business Central Manual, 2019, 757 pages.

\* cited by examiner

SYSTEMS AND METHODS FOR USING KITS AS A SOURCE OF INVENTORY IN A FULFILLMENT CENTER

RELATED APPLICATIONS

The present application claims the benefit of priority of U.S. Provisional Patent Application No. 63/211,489 filed Jun. 16, 2021, the entire contents of which are incorporated herein by reference.

TECHNICAL FIELD

Embodiments of the technology relate generally to systems and methods for dynamically managing order fulfillment and, more specifically, to using kits as a source of inventory in a fulfillment center.

BACKGROUND

Commerce is increasingly supported by complex systems of order fulfillment. The increase in electronic commerce, including on-line purchases and mail orders, has added to the complexity of order fulfillment. In order to efficiently and rapidly supply purchased items to purchasers, fulfillment management systems operated at fulfillment centers are used to optimize the gathering and shipping of items to purchasers. Fulfillment management systems can coordinate the work of human pickers and/or autonomous vehicles in the gathering of items for shipping.

SUMMARY

In one example embodiment, the present disclosure is directed to a computing system for managing the fulfillment of order items by disassembling kits. The computing system can include a communication device and at least one processor in communication with the communication device. The at least one processor can be configured to receive a determination to use a kit as a source of a first item. The at least one processor can be further configured to identify, by the at least one processor, a kit location comprising the kit, the kit comprising the first item and a second item. The at least one processor can be configured to create a kit disassembly pick job, the kit disassembly pick job identifying the kit location as an inventory source for the first item. Lastly, the at least one processor can be configured to transmit, via the communication device, the kit disassembly pick job to at least one autonomous vehicle.

Example embodiments of the foregoing computing system can include one or more of the following features. The determination to use the kit as a source of the first item can be received from one of: an e-commerce computing system; and a process executed by the at least one processor. Furthermore, the determination to use the kit as the source of the first item can be performed by a machine learning algorithm, wherein the machine learning algorithm is trained using one or more of: historical order data for the first item; and historical order data for the kit.

In another example of the foregoing computing system, the at least one processor can be further configured to: identify the first item as exceeding a low inventory threshold; identify the kit as the source of the first item; and make the determination to use the kit as the source of the first item. Before making the determination to use the kit as the source of the first item, the at least one processor can be further configured to: analyze order data for the first item; and analyze order data for the kit. The order data for the first item can comprise a predicted demand for the first item and the order data for the kit can comprise a predicted demand for the kit.

In another example of the foregoing computing system, the at least one processor can be further configured to: analyze updated order data for the first item; analyze updated order data for the kit; and make a second determination that the kit is no longer needed as the source of the first item. The at least one processor can be further configured to update an inventory level of the kit; and update an inventory level of the first item.

In another example of the foregoing computing system, the kit disassembly pick job can be one of: a heal job for resolving a short of the first item; and a modification of an existing pick job. In yet another example of the foregoing computing system, the kit disassembly pick job can comprise: a quantity of the kit to disassemble; instructions for disassembling the kit; and instructions for relocating the second item of the kit.

In another example embodiment, the present disclosure is directed to a method of using kits to fulfill orders for items in a fulfillment center. The method can comprise receiving, by at least one processor, a determination to use a kit as a source of a first item and identifying, by the at least one processor, a kit location comprising the kit, the kit comprising the first item and a second item. The method can further comprise creating, by the at least one processor, a kit disassembly pick job, wherein the kit disassembly pick job identifies the kit location as an inventory source for the first item. Lastly, the method can further comprise transmitting, via a communication device, the kit disassembly pick job to at least one autonomous vehicle.

Example embodiments of the foregoing method can include one or more of the following features. The determination to use the kit as a source of the first item can be received from one of: an e-commerce computing system; and a process executed by the at least one processor. Furthermore, the determination to use the kit as the source of the first item can be performed by a machine learning algorithm, wherein the machine learning algorithm is trained using one or more of: historical order data for the first item; and historical order data for the kit.

Another example of the foregoing method can further comprise identifying, by the at least one processor, the first item as exceeding a low inventory threshold; identifying, by the at least one processor, the kit as the source of the first item; and making, by the at least one processor, the determination to use the kit as the source of the first item. Before making the determination to use the kit as the source of the first item, the method can further comprise: analyzing, by the at least one processor, order data for the first item; and analyzing, by the at least one processor, order data for the kit. The order data for the first item can comprise a predicted demand for the first item; and the order data for the kit can comprise a predicted demand for the kit.

Another example of the foregoing method can further comprise analyzing, by the at least one processor, updated order data for the first item; analyzing, by the at least one processor, updated order data for the kit; and making, by the at least one processor, a second determination that the kit is no longer needed as the source of the first item. The foregoing method can further comprise updating, by the at least one processor, an inventory level of the kit; and updating an inventory level of the first item.

In another example of the foregoing method, the kit disassembly pick job can be one of: a heal job for resolving a short of the first item; and a modification of an existing pick job. In yet another example of the foregoing method, the kit disassembly pick job can comprise: a quantity of the kit to disassemble; instructions for disassembling the kit; and instructions for relocating the second item of the kit.

In another example embodiment, the present disclosure is directed to a non-transitory computer-readable medium having instructions stored thereon that, when executed by one or more computer processors, cause the computer processors to perform operations. The operations can comprise receiving a determination to use a kit as a source of a first item and identifying a kit location comprising the kit, the kit comprising the first item and a second item. The operations can further comprise creating a kit disassembly pick job, the kit disassembly pick job identifying the kit location as an inventory source for the first item. Lastly, the operations can further comprise transmitting the kit disassembly pick job to at least one autonomous vehicle.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of the disclosed systems and methods and therefore are not to be considered limiting of the scope of this disclosure. The principles illustrated in the example embodiments of the drawings can be applied to alternate systems and methods. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figure 1A:
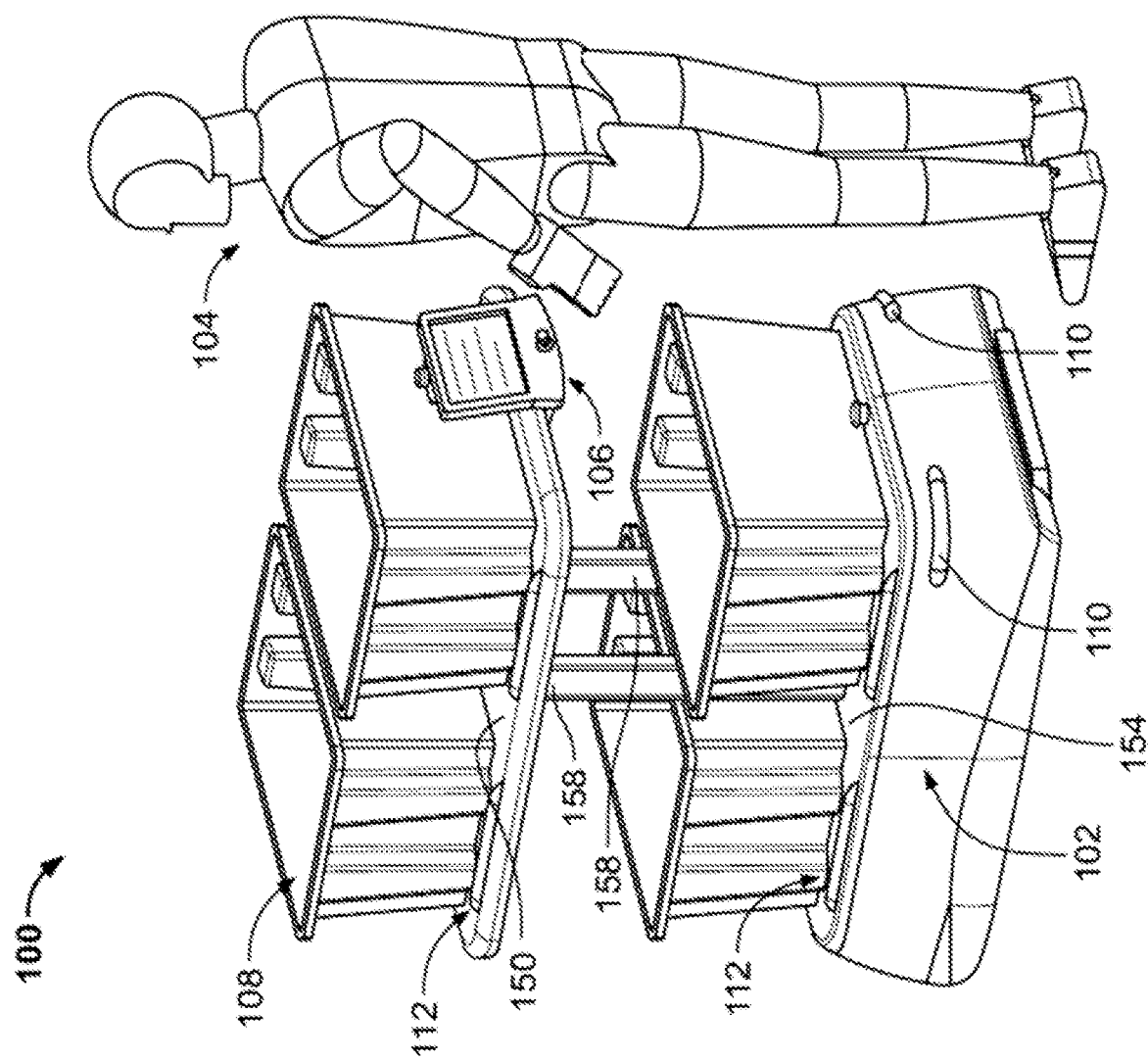
FIG. 1A is an illustration of an autonomous vehicle configured to collect items for an order in accordance with an example embodiment of the disclosure.

The example embodiments discussed herein are directed to systems and methods for managing the collection of items to fulfill customer orders. The fulfillment management system at a fulfillment center must consider a multitude of variables in optimizing the operation of the fulfillment center for efficiency. Variables the fulfillment management system can address include the numbers of available autonomous vehicles and workers, the availability of inventory to fulfill the received orders, the received orders and the corresponding dates on which the customers expect to receive their orders, the location of inventory within the fulfillment center, the routing of autonomous vehicles within the fulfillment center to collect items, the time required to collect items for an order, the packing of items for an order at a sorting, kitting, or pack-out station, and cutoff times for providing a packed order to a courier for shipping of the packed order. Additionally, the fulfillment center often has service level agreements with merchants that require fulfillment of a certain number of orders each day.

Customer orders can include a single item, multiple items, or a kit of items. As used herein, a "kit" refers to a collection of at least two items and an "item" encompasses any product that may be gathered at a fulfillment center for shipping to a customer. The items in a kit are typically bundled in a package to form the kit. In some cases, the kit may be associated with a promotional offer from a merchant to increase sales. In addition to the two or more items, the kit may include other materials such as a promotional insert, a coupon, or custom packaging items such as tissue paper or a unique packaging box. The two or more items and, if applicable, the additional materials can be bundled into a package to form the kit. Managing the creation and collection of kits within the fulfillment center introduces additional complexities the fulfillment management system must address.

One challenge that fulfillment management systems seek to address is gathering and shipping items and kits efficiently. In contrast to fulfilling orders for individual items, managing the fulfillment of kits adds complexity because the kits have multiple items and the kits typically have unique packaging and packaging instructions. The multiple items and unique packaging and packaging instructions create additional work for the fulfillment center. Fulfillment centers commonly fulfill hundreds or thousands of orders for kits and the additional work associated with each kit can dramatically increase the overall work for the fulfillment center.

The complexities associated with kits can consume a disproportionate amount of the fulfillment center's valuable resources, including the autonomous vehicles, the workers, and the computing systems that operate the fulfillment center. In particular, the need to coordinate the logistics of gathering the multiple items and additional materials for kits and the creation of the kits consumes additional processing and memory of the fulfillment center's computing systems along with the time of workers and the energy of autonomous vehicles. If resources are devoted to creating more kits than are needed, the fulfillment center does not operate efficiently. Conversely, if the fulfillment center does not plan ahead by creating a sufficient number of kits and there is a shortfall, then resources may need to be reallocated on an urgent basis, which can be inefficient. Therefore, effectively managing the creation of kits, including the collection of the items and additional materials used in kits, can improve the overall operation of the fulfillment center.

The fulfillment management system typically has two options when fulfilling orders for kits. First, kits can be assembled on-demand. In a kit on-demand approach, the fulfillment management system arranges for assembly of a kit as an order for the kit is fulfilled. If the ordered kit requires a first item and a second item, the fulfillment management system can first identify the SKU for each of the first and second item. The fulfillment management system then can use the individual SKUs to create a pick job for the collection of the first item and the second item. After collection, the first item and the second item are bundled into the kit in accordance with any instructions for assembling the kit. For example, instructions may specify how the first and second items, as well as any additional materials, are to be arranged in the kit box. In some cases, the items are bundled at a designated kitting station. However, implementing a kitting station in the kit on-demand approach introduces an additional operation into the fulfillment process and reduces efficiency. Accordingly, with the kit on-demand approach generally it is preferred that the items are bundled at a pack-out station where items and kits are packaged for shipping.

The second option for addressing orders for kits is to pre-assemble kits. In a kit pre-assembly approach, the fulfillment management system arranges for a number of kits to be pre-assembled by collecting a bulk amount of the items required for the kit. The items are pre-assembled into kits and the kits are stored at an inventory location in the fulfillment center so that the kits can be readily available to fulfill orders. The number of pre-assembled kits maintained in inventory may be controlled by service level agreements the fulfillment center has with merchants. In some cases, the pre-assembled kits will be assigned their own SKU so they can be treated similarly to individual items having their own SKU at the fulfillment center. When an order for a kit is received, the order can be fulfilled by creating a pick job for collecting the pre-assembled kit from its inventory location instead of collecting the individual items that make up the kit as in the kit on-demand approach. As an alternative to the inventory location containing the kit, the location of kits also can be referred to as the kit location or a staging location.

The kit on-demand approach and the kit pre-assembly approach each has certain advantages and efficiency tradeoffs. The kit on-demand approach typically requires additional pick time because items are picked individually and there may be additional packing time if the worker performing the packing is not familiar with the kit packing instructions. However, the kit on-demand approach can be advantageous in certain situations because it does not require the initial time invested in collecting a bulk amount of items and pre-assembling kits as well as the additional computing resources in managing the logistics associated with pre-assembling kits and managing the additional records (e.g., SKUs) associated with the kits. The kit on-demand approach also avoids the uncertainty as to whether actual demand for the kits will match the expected demand. On the other hand, while the kit pre-assembly approach requires an initial time investment, the pre-assembling of the kits can be performed during periods of lower activity at the fulfillment center. Additionally, gathering items in bulk and pre-assembling the items into kits on a large scale is typically more efficient from the perspective of worker time and autonomous vehicle resources. Choosing between the kit on-demand approach and the kit pre-assembly approach can have a dramatic impact on the efficiency of a fulfillment center that handles thousands of orders per day. Accordingly, finding a proper balance between the two kitting approaches can enable the fulfillment management system to operate more efficiently.

An additional complication with the pre-assembly of kits is that they consume the inventory for the individual items used to make up the kit. While efficiencies can be gained by pre-assembling many kits during periods of low activity at the fulfillment center, pre-assembling too many kits may cause a shortage of inventory for the individual items that are used in the kits as the individual items are also needed to fulfill orders. Therefore, the fulfillment management system must determine the proper balance between ensuring sufficient inventory of individual items and gaining the efficiency of pre-assembling a certain volume of kits.

During certain periods of time, the inventory for an item at the fulfillment center may exceed a low inventory threshold or may reach zero. This may occur if the fulfillment center consumes all of the inventory of the item, if the inventory for the item is damaged, or if there are delays in restocking the inventory for the item. When the inventory for an item reaches zero, it can be very disruptive to the operations of the fulfillment center because all orders requiring the item will not be able to be completed. This disruption can result in incomplete orders located throughout the fulfillment center and can negatively affect efficiency. Furthermore, the shorted order may be unable to meet a shipping cutoff time for the order resulting in missed shipping guarantees and frustrated customers. In addition to the disruption in the use of workers and autonomous vehicles, exhausting an inventory of an item causes the computing systems of the fulfillment center to use more resources in that the records and logistics (e.g., routing) associated with accumulating incomplete orders must be managed and future pick jobs may need to be modified.

One solution to the disruption and negative consequences caused by exhausting the inventory of an item, is use the pre-assembled kits stored at the fulfillment center as an alternative source of inventory. In other words, the pre-assembled kits may contain the individual items needed to replenish the inventory of the item. As an example, the fulfillment center may have pre-assembled kits containing two shampoo bottles and two conditioner bottles. If there is a short or an anticipated short for orders requiring individual shampoo bottles, the pre-assembled kits can be disassembled and the shampoo bottles removed for use in fulfilling the orders for individual shampoo bottles.

The fulfillment management system can create a kit disassembly pick job to disassemble the pre-assembled kits so that the individual items can be removed from the kits and used to fulfill orders for the individual items. A kit disassembly pick job can provide a short term solution to situations of exhausted inventory for an item. However, disassembling kits has its own negative effects on efficiency because it involves undoing the work performed in assembling the kits and sacrificing the efficiencies gained from assembling those kits. Furthermore, disassembling the kits creates additional work in that a certain amount of time is required to disassemble the kits and relocate the remaining kit packaging and items. Accordingly, the fulfillment management system must weigh different factors in deciding when to turn to kit disassembly as a source of inventory.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Enhanced Cart System Used in Example Embodiments

FIG. 1A illustrates an enhanced cart system 100 that can be used in the example embodiments described herein. The enhanced cart system 100 includes an enhanced cart 102

(also referred to as a picking cart) that can be an autonomous vehicle, a semi-autonomous vehicle, or simply a wheeled cart that is moved by a worker 104. The enhanced cart system 100 can include a user interface 106 (e.g. a touch screen, a tablet device, a personal digital assistant, a scanning device, etc.), indicator lights 110, 112, and one or more audio speakers that assist the worker accompanying the enhanced cart system 100. The enhanced cart 102 can be propelled by a motor (e.g., an electric motor) that is coupled to a power source (e.g., a battery, a supercapacitor, etc.) that can be periodically recharged. Workers within a fulfillment center can use enhanced carts to move inventory within the fulfillment center. The workers can be humans, robots, or a combination of humans and robots. Workers can use enhanced carts for tasks such as picking, re-stocking, moving, sorting, counting, or verifying items. In some cases, kitting items or a portion of the process of kitting items, such as placing two items in a box, can be performed on the enhanced cart. Additionally, disassembling kits of items can also take place on the enhanced cart.

As illustrated in FIG. 1A, one or more storage containers 108 (also referred to as totes) may be placed on the enhanced cart 102 for containing items gathered throughout the fulfillment center. The gathering and placement of items into the storage containers 108 can be done by workers, can be automated by machines, or can be performed through a combination of workers and machines. The storage containers 108 are also removable from the enhanced cart 102, such as when the storage containers holding the gathered items arrive at a pack-out station for packing and shipping. In some cases, each storage container 108 can be used for a single order. In other cases, a storage container 108 can be used for batch picking where the container holds multiple complete or partial orders that are delivered to a post-pick station for sorting, kitting, processing, and/or packing. Hybrid approaches are possible in some cases where one storage container 108 on the enhanced cart 102 is for a single order while another storage container on the same enhanced cart 102 is used for batch picking. In some cases, the single order may be a time sensitive order, whereas the batch picking is associated with a pick job for kit pre-assembly or with orders that are less time sensitive. In yet other cases, the storage containers 108 can be used for items that are to be counted or items that are to be moved or re-stocked within the fulfillment center.

Figure 1B:
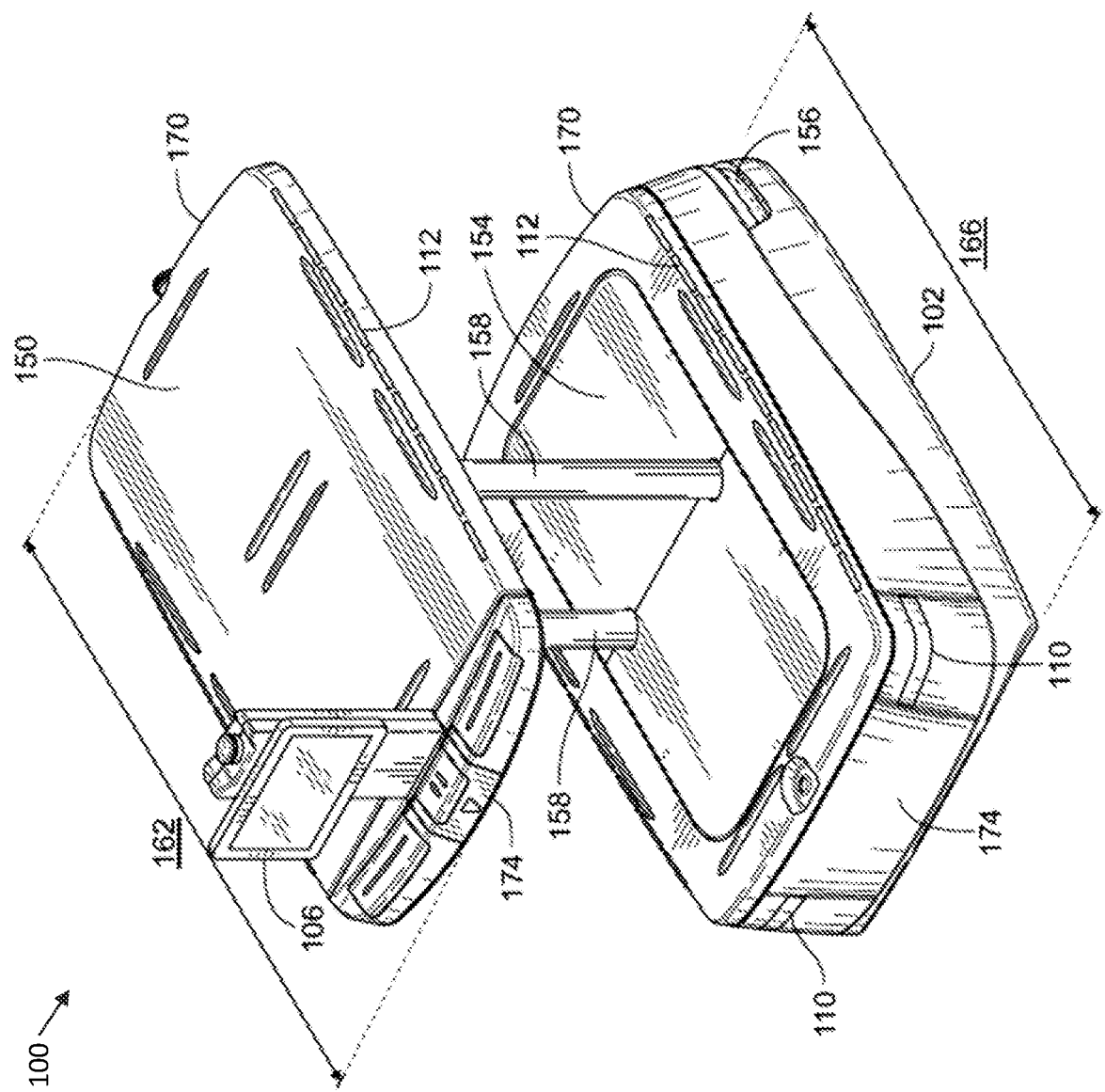
FIG. 1B is an illustration of another autonomous vehicle configured to collect items for an order in accordance with an example embodiment of the disclosure.

FIG. 1B illustrates another example of an enhanced cart system 100, but with the storage containers removed for purposes of illustration. As with the example of FIG. 1A, the enhanced cart system 100 of FIG. 1B includes an enhanced cart 102 having a user interface 106 and indicator lights 110, 112. The enhanced cart 102 of both FIGS. 1A and 1B can include upper and lower platforms 150, 154 on which the storage containers 108 can be placed. At least one support 158 can support the upper platform 150 above the lower platform 154. The at least one support 158 can be substantially centrally-located along the respective lengths 162, 166 of the upper and lower platforms 150, 154 between the front end 170 and back end 174 of the enhanced cart 102. As illustrated in FIG. 1B, the front end 170 of the enhanced cart 102 can define a recess 156. One or more sensors (e.g., light detecting and range detecting) can be housed within the recess 156. The recess 156 permits the one or more sensors to have a field of detection in front of and to the side of the enhanced cart 102.

The following discussion will describe the use of enhanced cart systems to efficiently manage orders for kits within a fulfillment center. While the examples that follow refer to the specific example of an autonomous vehicle for the enhanced cart system, it should be appreciated that carts of varying complexity and features can be used in the described examples.

Fulfillment Management System

Figure 2:
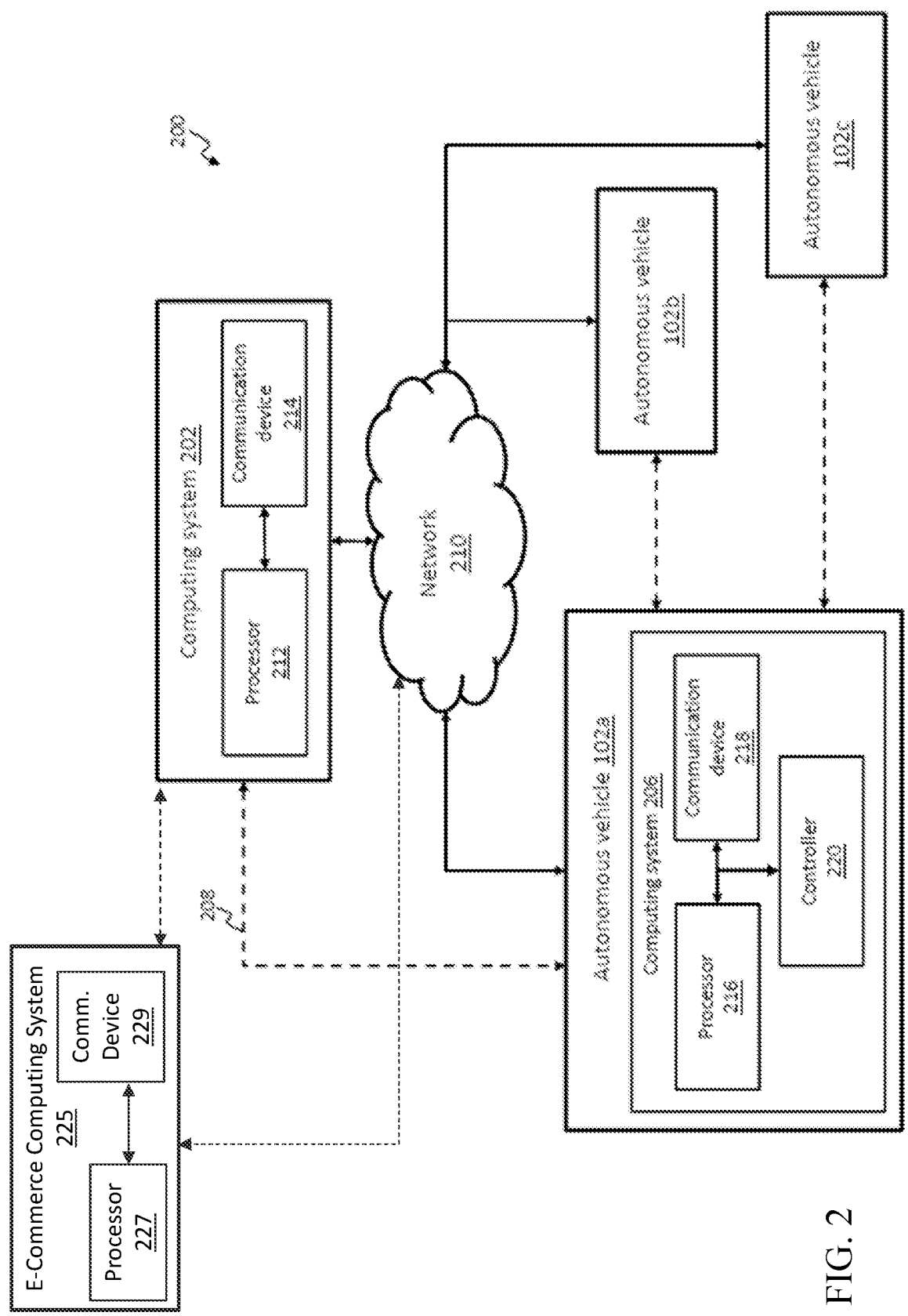
FIG. 2 is a block diagram of a system for managing order fulfillment in accordance with an example embodiment of the disclosure.

FIG. 2 illustrates a block diagram of a fulfillment management system 200 configured to manage orders within one or more fulfillment centers. The fulfillment management system 200 can receive customer orders from an order processing system and the order processing system can receive orders from customer devices (e.g. phones, smartphones, computers). In an alternative embodiment, the fulfillment management system can be a part of the order processing system. In the example embodiment illustrated in FIG. 2, the order processing system is an e-commerce computing system 225. In some examples, the e-commerce computing system 225 can organize orders for fulfillment by identifying the availability at the fulfillment center of items within the order. The fulfillment management system 200 can place orders and items in groupings, which can be referred to as pick jobs, for use in gathering the items from the fulfillment center.

The fulfillment management system 200 can include a computing system 202 configured to be coupled directly or indirectly to one or more autonomous vehicles 102a, 102b, and 102c (collectively referred to as 102) such as the autonomous vehicles described in connection with FIGS. 1A and 1B. In one example, the computing system 202 can communicate directly with the vehicle computing system 206 of an autonomous vehicle 102 via a communication channel 208. Additionally, or alternatively, the computing system 202 can communicate with one or more autonomous vehicles 102 via a network device of network 210. In some embodiments, computing system 202 can communicate with a first autonomous vehicle (e.g., vehicle 102a) via a second autonomous vehicle (e.g. vehicle 102b).

The computing system 202 of the example fulfillment management system 200 can be located locally at the fulfillment center, can be located remotely from the fulfillment center (e.g., hosted in a cloud computing system), or can be distributed with components located both locally and remotely. As shown in FIG. 2, example computing system 202 can include a processor 212 that communicates with a communication device 214. The communication device 214 can receive messages from and transmit messages to the processor 212, the e-commerce computing system 225, and the autonomous vehicles 102. Similar to the computing system 202, the e-commerce computing system 225 can comprise one or more processors 227 and a communication device 229.

With respect to communications the computing system sends to the autonomous vehicles 102, the messages can include picking instructions (e.g., product or kit name, product or kit description, product or kit image, quantity, location within the fulfillment center), navigation instructions, and shipping deadlines. Messages the autonomous vehicles 102 can transmit to the communication device 214 include confirmations when an item or kit is picked or a pick job is complete and exception messages indicating that an item or kit is not available for collection at an inventory location within the fulfillment center. The messages can be visual and/or audible and can be communicated using the user interface 106, the indicator lights 110, 112, or an audio speaker.

The example system of FIG. 2 also illustrates certain components of example autonomous vehicle 102a. Example autonomous vehicle 102a can include a vehicle computer system 206 that comprises a vehicle processor 216, a vehicle communication device 218, and a vehicle controller 220. The vehicle communication device 218 can communicate with communication device 214 via channel 208 or via network 210. The vehicle processor 216 can process signals from the communication device 214, from the vehicle communication device 218, and from other components onboard the autonomous vehicle 102a such as light detecting or range detecting sensors. The vehicle controller 220 can send control signals to components onboard the autonomous vehicle 102a such as a navigation system that controls the movement of the autonomous vehicle 102a. As one example, the vehicle computer system 206 can receive a job from computing system 202, wherein the job identifies one or more items or kits to be retrieved and inventory locations (e.g., bins or shelves) for the one or more items or kits within the fulfillment center. The vehicle controller 220 and the navigation system can use the location information associated with the one or more items or kits to navigate the autonomous vehicle to the inventory location containing the one or more items or kits. The other autonomous vehicles 102b, 102c can include components similar to those shown on autonomous vehicle 102a.

Determining to Use a Kit as a Source for an Item

When the computing system 202 transmits a pick job to an autonomous vehicle 102, the pick job can identify items and kits for collection and placement in the storage containers 108. As described previously, in situations where an inventory for an item is low or has been exhausted, the fulfillment management system may determine that pre-assembled kits should be collected and used as an inventory for the item. The need for the item may arise from an exception where the item cannot be collected to fulfill an existing order. Alternatively, the need for the item may arise when demand for an item in received orders exceeds the remaining inventory of the item. In yet another alternative, the need for the item may arise when demand for an item in predicted orders, or a combination of received orders and predicted orders, exceeds the remaining inventory of the item.

Given the complexities and inefficiencies associated with disassembling kits, the fulfillment management system can consider a variety of factors in determining whether to disassemble kits to replenish an inventory for an individual item. For example, the fulfillment management system can consider when an inventory replenishment is likely to occur in the absence of disassembling kits. The fulfillment management system also can estimate the number of orders likely to be shorted and the impact on shipping deadlines if the kits are not disassembled to obtain the needed individual items. Implementing the following example methods allows the fulfillment management system to manage low inventory and minimize the disruptions caused by exhausting inventory. By avoiding the disruptions of exhausting inventory, the fulfillment center's computing systems can operation more efficiently because they do not have to manage the records and modify the logistics associated with incomplete orders. Additionally, the productivity of workers and autonomous vehicles can be improved by avoiding wasted trips through the fulfillment center.

Figure 3:
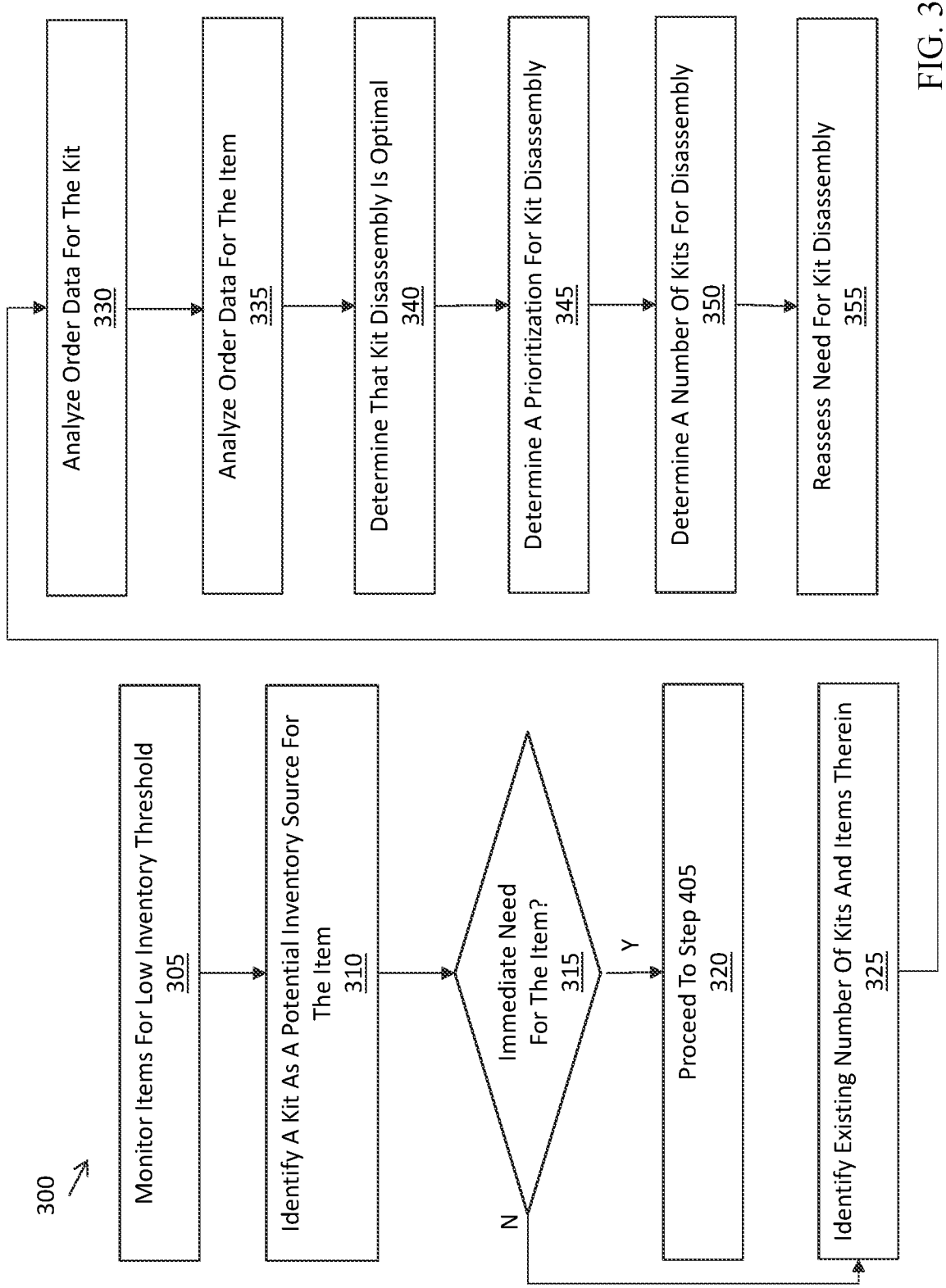
FIG. 3 is a flow chart illustrating a method for determining to use a kit as a source for an item in accordance with an example embodiment of the disclosure.

Turning to FIG. 3, an example method 300 is illustrated that addresses determining when kits should be disassembled to obtain the constituent items of the kit for fulfilling orders. The operations of example method 300 can be implemented as computer-readable instructions executed by computing system 202 and/or e-commerce computing system 225. It should be understood that in alternate embodiments certain operations of method 300 can be combined, performed in parallel, or performed in a different sequence and that other operations may be added to method 300.

In operation 305 of example method 300, computing system 202 can monitor the inventory of items at the fulfillment center to identify items where a low inventory threshold may be exceeded. The monitoring operation can include analyzing current orders for items as well as estimated future orders to anticipate if any items are likely to be exhausted. received kit orders and kit inventory to determine whether there is sufficient inventory to meet the demand for kits. The monitoring can be performed at any desired frequency, including but not limited to daily, hourly, several times an hour, or at the beginning of each shift change at the fulfillment center. In alternative embodiments, the monitoring can be performed in combination with or solely by the e-commerce computing system 225. As another alternative, a manager associated with the fulfillment center or the e-commerce computing system 225 may recognize a shortage of inventory for a particular item or an actual or expected increase in demand for the item, such as before a holiday, and can identify the item for use in method 300.

In operation 310, for any items identified as exhausted or exceeding a low inventory threshold, the fulfillment management system can identify whether there are pre-assembled kits within the fulfillment center that contain the identified items. Any such identified kits can be designated as potential sources of inventory for the identified item. In operation 315, the identified item may be designated as having an immediate need, for example, if the inventory is exhausted and there are shorted orders waiting to receive the identified item. If there is an immediate need, example method 300 can proceed to operation 320, skipping the analysis in the remaining operations of method 300 and going directly to operation 405 of FIG. 4 where a kit disassembly pick job will be created.

Alternatively, if the need for the identified item is prospective, example method 300 can proceed to operation 325 where the computing system 202 identifies the number of existing pre-assembled kits and the number of the identified item in the pre-assembled kits. Using the previous example of the two shampoo bottles, disassembling one kit would yield two individual shampoo bottles that could be used to fulfill individual orders. The number of identified items in the kit can be used to determine the number of kits that need to be disassembled in order to have a sufficient inventory of the individual item.

Referring to operation 330, the computing system 202, can analyze order data for the assembled kits to determine the demand for the kits. The data can include one or more of current order data, historical order data encompassing months or years, and data estimating future orders for the kit. In some cases, the e-commerce computing system 225 can supply a portion or all of the kit order data or can perform the analysis and supply it to the computing system 202. In certain embodiments, a machine learning algorithm can be trained using historical order data and can be used to predict the demand for the kit. Assessing the demand for the kits can inform how many kits can safely be disassembled for use in individual orders without encountering a short in orders for the kits.

In operation 335, the computing system 202 can analyze order data for the item that was identified as having a low inventory threshold. The item data can include one or more of current order data, historical order data encompassing months or years, and data estimating future orders for the item. In some cases, the e-commerce computing system 225 can supply a portion or all of the item order data or can perform the analysis and supply the analysis to the computing system 202. In certain embodiments, a machine learning algorithm can be trained using historical order data and can be used to predict the demand for the item. The analysis of the demand for the item can be used to determine how many kits should be disassembled in order to provide an inventory for individual orders of the item.

In operation 340, the computing system 202 can consider the results of the analysis of the demand for the kit and the demand for the item as well as other factors relevant to disassembling the kit. For example, the computing system 202 can assign an inefficiency cost associated with disassembling the kits based a complexity of the kits, a time invested in assembling the kits, or a time required to disassemble the kits and re-stock the kit items that are not needed. In some cases, a machine learning algorithm can be used to further analyze the costs in combination with the demand for the kit and the item. The machine learning algorithm can be trained using one or more of historical demand data for the kit, historical demand data for the item, and historical data associated with the costs of disassembling the kit.

If in operation 340, the computing system 202 determines, based on the demand and costs analyses, that kit disassembly is the optimal solution for addressing the low inventory of the identified item, method 300 will proceed to operation 345. Alternatively, if the computing system 202 determines that kit disassembly is not the optimal solution, the method can return to operation 305 to continue monitoring the inventory of items at the fulfillment center. Kit disassembly has associated costs in that the computing systems must create kit disassembly pick jobs that manage the items and additional materials in the kits and the disassembly negates the efficiencies previously gained in pre-assembling the kits. Therefore, the analysis and determination of operations 335 and 340 ensures that kit disassembly is deployed only when its benefits outweigh its costs.

If the computing system 202 determines that disassembly of the kit is optimal, it can then determine the specific implementation for the disassembly of the kit. In operation 345, the computing system 202 can determine a prioritization for the kit disassembly. For example, if there is an immediate or near-term need for the item, the computing system 202 can assign a high prioritization to the kit disassembly and can promptly generate kit disassembly pick jobs. Alternatively, if the need for the item is not immediate, but the computing system anticipates that there will be a need for the items in the future, the kit disassembly work can be assigned a lower prioritization and kit disassembly pick jobs can be assigned when workers or autonomous vehicles are available or in need of work. As another example of a less immediate need, the computing system 202 may determine that too many kits have been assembled in the past and the fulfillment center is unlikely to use the assembled kits. In such a situation, the computing system can designate kit disassembly work with a lower prioritization.

Related to the prioritization of the kit disassembly work, in operation 350, the computing system 202 can determine a number of kits to disassemble or a length of time during which the kit disassembly work is to be performed. For example, based on the order data analyzed for the kit and the item in connection with operations 330 and 335, if there is a current or expected high demand for the item, the computing system 202 can designate that a large number of the kits should be disassembled. As another example, if a period of low activity is expected at the fulfillment center for the next three hours, the computing system 202 can set the kit disassembly work to be performed over the next three hours as workers and autonomous vehicles become available.

Lastly, in operation 355, the computing system 202 can periodically reassess the need to disassemble the kits for the identified item. The computing system 202 can perform the reassessment by repeating the operations of method 300 as new data becomes available or new conditions arise at the fulfillment center relating to inventory levels and demand for the kit and item. Alternatively, the reassessment can be set to occur after a designated time or after a predetermined number of kit disassembly pick jobs are assigned. For example, if the actual orders for the item received over time do not meet the number of orders that were previously expected, the computing system 202 can perform or can receive a second determination that the disassembly of the kits is no longer necessary. As another example, if the fulfillment center receives a new shipment of the item, the kit disassembly work may no longer be needed.

Fulfilling an Order for an Item by Disassembling a Kit

Figure 4:
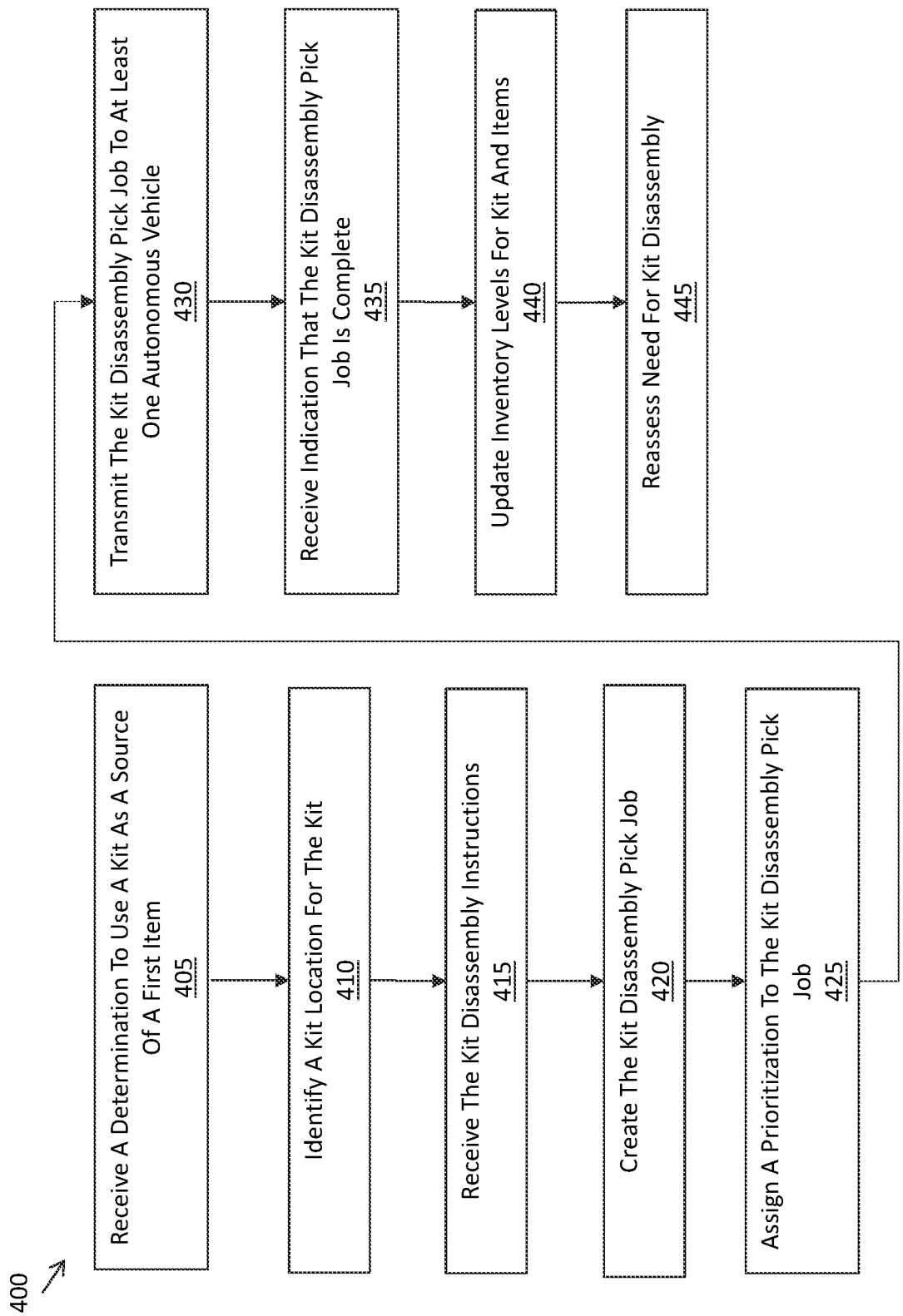
FIG. 4 is a flow chart illustrating a method for fulfilling an order for an item by disassembling a kit in accordance with an example embodiment of the disclosure.

FIG. 4 illustrates an example method 400 for creating a kit disassembly pick job in response to the determination from method 300 of FIG. 3. The operations of example method 400 can be implemented as computer-readable instructions executed by computing system 202 and/or e-commerce computing system 225. It should be understood that in alternate embodiments certain operations of method 400 can be combined, performed in parallel, or performed in a different sequence and that other operations may be added to method 400.

Performing method 300 of FIG. 3 allows the fulfillment management system 200 to improve operations by identifying solutions to situations of low inventory or exhausted inventory for items. In response, in operation 405 of FIG. 4, the computing system 202 can receive the determination from method 300 to use a kit as a source of inventory for a first item. In operation 410, the computing system 202 can identify a location within the fulfillment center, such as a bin or shelf, where the kits are located. Alternatively, the location of the kits may have already been identified in connection with operation 310 of method 300.

In operation 415, the computing system 202 receives instructions for disassembling the kit. The instructions may be manually entered into the computing system 202 in some situations. The instructions may specify whether items should be scanned when they are removed from the kit and how the packaging box and any inserts should be handled.

In operation 420, the computing system 202 can create a kit disassembly pick job for the kit identified in method 300. The kit disassembly pick job can be referred to as a heal job that resolves an outstanding short where the missing item for an order will be retrieved from the kit that is to be disassembled. Another term for a heal job is a resolution job. Alternatively, the kit disassembly pick job can modify an existing job associated with the kit. The kit disassembly pick job can identify the kit to be collected and disassembled, the location of the kit, the number of kits to be collected and disassembled, and the disassembly instructions identified in operation 415. Furthermore, the kit disassembly pick job can include a second workflow for the additional items in the kit that are not needed for replenishing the item inventory. The second workflow may indicate a location to which the additional items should be moved.

In operation 425, the computing system 202 can assign a prioritization to the kit disassembly pick job. If in operation 345 of method 300 the kit disassembly was assigned a low priority, the computing system 202 may delay creating the kit disassembly pick job or may assign a low prioritization to the kit disassembly pick job. Conversely, if in operation 345 of method 300 it was determined that the need for the item is a high priority, the computing system 202 can assign a high prioritization to the kit disassembly pick job.

In operation 430, the computing system 202 can transmit, via communication device 214, the kit disassembly pick job to the autonomous vehicle 102. The kit disassembly pick job can be received by the vehicle communication device 218 and displayed for a worker on user interface 106. In some cases, the kit disassembly pick job displayed on the user interface 106 can show the kit name, description, and/or image, the inventory location for the kit, and the identified item that is needed from the kit to replenish an inventory. In some cases, the navigation system onboard the autonomous vehicle 102 can receive the inventory location and use a stored map of the fulfillment center to determine a route to the inventory location for the item. The navigation system can also direct the autonomous vehicle 102 to proceed to the inventory location using the determined route. Upon arriving at the inventory location, the autonomous vehicle, the worker, a robotic machine, or a combination of the foregoing can collect the specified number of kits and place them in the storage container 108. In connection with placing the kits in the storage container 108, the worker may also be instructed to disassemble the kit and place its constituent items in different containers on the autonomous vehicle. After collecting the kit, the pick job may direct the autonomous vehicle and the worker to another inventory location to deposit the additional items that were in the kit as part of the second workflow mentioned previously. With respect to the identified item that was needed from the kit, the kit disassembly pick job may direct the autonomous vehicle to an inventory location for the item or a pack-out station to supply the identified item to a shorted order.

In operation 435, the computing system 202 may receive an indication (e.g., a signal, a notification, a message, etc.) that the kit disassembly pick job is complete. The indication may be an explicit confirmation message from the autonomous vehicle 102. Alternatively, the indication may be implied from another message, such as a message indicating the autonomous vehicle has begun working on the next pick job in its queue.

In operation 440, the computing system 202 can update inventory levels to reflect the disassembly of the kit. In one example, the number of the specific kits can be decreased to reflect the disassembly of the kit and the inventory numbers for the items retrieved from the kit can be increased accordingly.

Lastly, in operation 445, the computing system 202 can reassess whether disassembling of the identified kit is still needed for replenishing inventory of the identified item. In some cases, the reassessment can occur after a predetermined time. Alternatively, the reassessment can occur after the kit disassembly pick job is complete or after a certain number of kit disassembly pick jobs are complete.

Similar to operation 355 in example method 300, the reassessment can include repeating operations of method 300 as new data becomes available or new conditions arise at the fulfillment center relating to inventory levels and demand for kits and items. As the number of actual or predicted orders for the kits and items changes over time, the computing system 202 can reevaluate the need to disassemble the kits and can make or can receive a second determination with respect to disassembling of the kits. Performing operation 445 allows the computing system 202 to balance efficiency with the need to maintain inventory for individual items. The adjustment can include canceling kit disassembly pick jobs that are no longer necessary or modifying existing pick jobs.

Utilizing kits as a source for inventory of individual items can be a helpful stopgap in situations where inventory has been depleted. However, the methods described herein enable strategic application of the kit disassembly strategy so not to lose efficiency unnecessarily. Strategically applying the kit disassembly strategy allows the computing systems of the fulfillment center to avoid the demands on processing and memory resources that are associated with the disruption of a depleted inventory item. In other words, the computing systems can avoid the need to manage accumulating incomplete orders and the logistics associated with those incomplete orders. The fulfillment center can also avoid the costs in worker productivity and autonomous vehicle efficiency that occur when an inventory item is depleted.

Computing Systems

In certain embodiments, some or all of the processing operations described in connection with the foregoing methods can be performed by computing systems such as a personal computer, a desktop computer, a centralized computer, or cloud computing systems. As explained previously, certain operations of the foregoing methods can be performed by a combination of computing systems.

Figure 5:
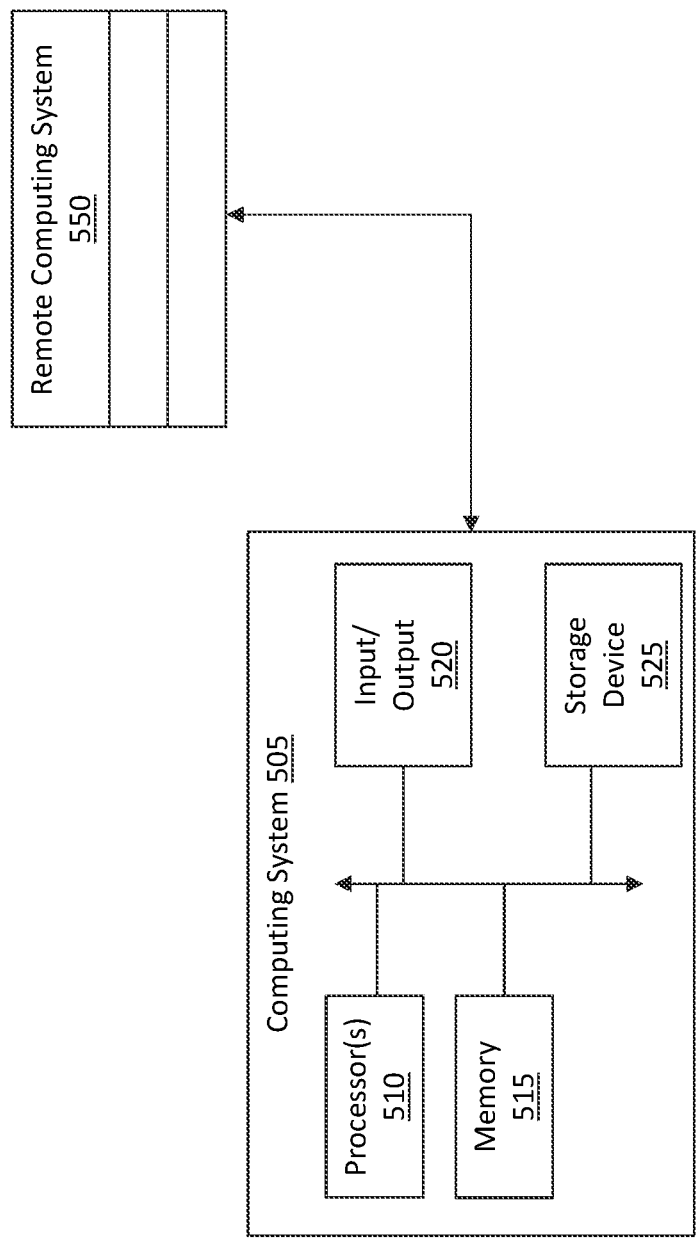
FIG. 5 is a block diagram of a computing system in accordance with an example embodiment of the disclosure.

Referring to FIG. 5, an example of a computing system is illustrated. The computing system 505 can represent a component of or one of the computing systems previously described herein, including a fulfillment management system, an order processing system, an e-commerce computing system, computing system 202, and vehicle computing system 206. Computing system 505 includes a processor 510, a memory 515, an input/output device 520, and a storage device 525. Each of the components of the computing system 505 can be interconnected, for example, by a system bus. The components of computing system 505 shown in FIG. 5 are not exhaustive, and in some embodiments, one or more of the components shown in FIG. 5 may not be included in an example system. Further, one or more components shown in FIG. 5 can be rearranged.

The processor 510 can be one or more hardware processors and can execute computer-readable instructions, such as instructions stored in memory 515. The processor 510 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 515 can store information including computer-readable instructions and data associated with the fulfillment center. The memory 515 can be cache memory, a main memory, and/or any other suitable type of memory. The memory 515 is a non-transitory computer-readable medium. In some cases, the memory 515 can be a volatile memory device, while in other cases the memory can be a non-volatile memory device.

The storage device 525 can be a non-transitory computer-readable medium that provides large capacity storage for the computing system 505. The storage device 525 can be a disk drive, a flash drive, a solid state device, or some other type of storage device. In some cases, the storage device 525 can be a database that is remote from the computing system 505. The storage device can store operating system data, file data, database data, algorithms, and software modules, as examples. In the case of the computing system 202, the storage device can store algorithms embodying the operations of the methods described herein. The storage device can also store data related to pick jobs, communications with the autonomous vehicles 102, and the performance of the fulfillment management system.

Lastly, the input/output device 520 provides an interface to other devices, such as a touch screen interface, and other computing systems such as remote computing system 550. The input/output device 520 can provide signal transfer links for communications with other devices and computing systems. The signal transfer links can include wired and/or wireless signal transfer links that transmit and receive communications via known communication protocols. For instance, the signal transfer links can provide wireless links to the autonomous vehicles 102. In some instances, the input/output device 520 can include a wired or wireless network interface device.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain operations of the methods may be performed in a different order, may be performed in parallel, or may be omitted. Moreover, in alternate embodiments additional operations may be added to the example methods described herein. Accordingly, the example methods provided herein should be viewed as illustrative and not limiting of the disclosure.

Terms such as "first" and "second" are used merely to distinguish one element or operation from another. Such terms are not meant to denote a preference or a particular order, and are not meant to limit the embodiments described herein. In the example embodiments described herein, numerous specific details are set forth in order to provide a more thorough understanding of the disclosure. However, it will be apparent to one of ordinary skill in the art having regard to the present application that the embodiments may be practiced without these specific details. In other instances, well-known features have not been described in detail to avoid unnecessarily complicating the description.

As used herein, the terms "a," "an," and "the" are intended to include plural alternatives, e.g., at least one. The phrase "and/or" means either or both. The terms "including", "with", and "having", as used herein, are defined as comprising (i.e., open language), unless specified otherwise.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Although embodiments described herein are made with reference to example embodiments, it should be appreciated by those skilled in the art having regard to the present application that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A computing system comprising:
    a communication device;
    machine-readable instructions; and
    at least one processor in communication with the communication device, the at least one processor to execute the machine-readable instructions to:
        determine to use a kit as a source of a first item;
        identify, a kit location including the kit, the kit including the first item and a second item;
        create a kit disassembly pick job, the kit disassembly pick job identifying the kit location as an inventory source for the first item;

assign a first prioritization level or a second prioritization level to the kit disassembly pick job; and transmit, via the communication device, signals to an autonomous vehicle to cause the autonomous vehicle to travel to the kit location at a first time when the kit disassembly pick job is assigned the first prioritization level and cause the autonomous vehicle to travel to the kit location at a second time when the kit disassembly pick job is assigned the second prioritization level, the second time based on an availability of the autonomous vehicle, the second time later than the first time.

2. The computing system of claim 1, wherein the at least one processor is to determine to use the kit as the source of the first item based on instructions received from one of:

an e-commerce computing system; or a process executed by the at least one processor.

3. The computing system of claim 1, wherein the at least one processor is to determine to use the kit at as the source of the first item by:

identifying the first item as exceeding a low inventory threshold; and identifying the kit as the source of the first item.

4. The computing system of claim 3, wherein before determining to use the kit as the source of the first item, the at least one processor is to:

analyze order data for the first item; and analyze order data for the kit.

5. The computing system of claim 4, wherein, the order data for the first item includes a predicted demand for the first item; and the order data for the kit includes a predicted demand for the kit.

6. The computing system of claim 1, wherein the at least one processor is to execute a machine learning algorithm to determine to use the kit as the source of the first item, wherein the machine learning algorithm is trained using one or more of:

historical order data for the first item; or historical order data for the kit.

7. The computing system of claim 1, wherein the at least one processor is to:

analyze updated order data for the first item;

analyze updated order data for the kit; and determine that the kit is no longer needed as the source of the first item.

8. The computing system of claim 1, wherein the kit disassembly pick job is one of:

a heal job for resolving a short of the first item; or a modification of an existing pick job.

9. The computing system of claim 1, wherein the kit disassembly pick job includes:

a quantity of the kit to disassemble;

instructions for disassembling the kit; and instructions for relocating the second item of the kit.

10. The computing system of claim 1, wherein the at least one processor is to:

update an inventory level of the kit; and update an inventory level of the first item.

11. A computer-implemented method comprising:

determining, by at least one processor, to use a kit as a source of a first item;

identifying, by the at least one processor, a kit location including the kit, the kit including the first item and a second item;

creating, by the at least one processor, a kit disassembly pick job, the kit disassembly pick job identifying the kit location as an inventory source for the first item;

assigning, by the at least one processor, a first prioritization level or a second prioritization level to the kit disassembly pick job; and transmitting, via a communication device, signals to an autonomous vehicle to cause the autonomous vehicle to travel to the kit location at a first time when the kit disassembly pick job is assigned the first prioritization level and cause the autonomous vehicle to travel to the kit location at a second time when the kit disassembly pick job is assigned the second prioritization level, the second time based on an availability of the autonomous vehicle, the second time later than the first time.

12. The computer-implemented method of claim 11, wherein the determining is based on instructions received from one of:

an e-commerce computing system; or a process executed by the at least one processor.

13. The computer-implemented method of claim 11, further wherein the determining to use the kit as the source of the first item includes:

identifying, by the at least one processor, the first item as exceeding a low inventory threshold; and identifying, by the at least one processor, the kit as the source of the first item.

14. The computer-implemented method of claim 13, further including, before determining to use the kit as the source of the first item:

analyzing, by the at least one processor, order data for the first item; and analyzing, by the at least one processor, order data for the kit.

15. The computer-implemented method of claim 14, wherein, the order data for the first item includes a predicted demand for the first item; and the order data for the kit includes a predicted demand for the kit.

16. The computer-implemented method of claim 11, wherein the determining to use the kit as the source of the first item includes executing a machine learning algorithm, wherein the machine learning algorithm is trained using one or more of:

historical order data for the first item; or historical order data for the kit.

17. The computer-implemented method of claim 11, further including:

analyzing, by the at least one processor, updated order data for the first item;

analyzing, by the at least one processor, updated order data for the kit; and determining, by the at least one processor, that the kit is no longer needed as the source of the first item.

18. The computer-implemented method of claim 11, wherein the kit disassembly pick job is one of:

a heal job for resolving a short of the first item; or a modification of an existing pick job.

19. The computer-implemented method of claim 11, wherein the kit disassembly pick job includes:

a quantity of the kit to disassemble;

instructions for disassembling the kit; and instructions for relocating the second item of the kit.

20. A non-transitory computer-readable medium having instructions stored thereon that, when executed by one or more computer processors, cause the one or more computer processors to:

determine to use a kit as a source of a first item;

identify a kit location including the kit, the kit including the first item and a second item;

create a kit disassembly pick job, the kit disassembly pick job identifying the kit location as an inventory source for the first item;

assign a first prioritization level or a second prioritization level to the kit disassembly pick job; and transmit signals to an autonomous vehicle to cause the autonomous vehicle to travel to the kit location at a first time when the kit disassembly pick job is assigned the first prioritization level and cause the autonomous vehicle to travel to the kit location at a second time when the kit disassembly pick job is assigned the second prioritization level, the second time based on an availability of the autonomous vehicle, the second time later than the first time.

\* \* \* \* \*